US011890921B2

(12) United States Patent
Qiu et al.

(10) Patent No.: US 11,890,921 B2
(45) Date of Patent: Feb. 6, 2024

(54) EXTERNAL HARD BED COVER FOR A PICKUP TRUCK

(71) Applicant: Ningbo Crosstrip Electronic Science Co., Ltd, Cixi (CN)

(72) Inventors: Lei Qiu, Cixi (CN); Lei Chen, Cixi (CN)

( * ) Notice: Subject to any disclaimer, the term of this patent is extended or adjusted under 35 U.S.C. 154(b) by 36 days.

(21) Appl. No.: 17/864,928

(22) Filed: Jul. 14, 2022

(65) Prior Publication Data

US 2023/0398846 A1 Dec. 14, 2023

(30) Foreign Application Priority Data

Jun. 9, 2022 (CN) .......................... 202210646503.0

(51) Int. Cl.
*B60J 7/14* (2006.01)
*B60R 11/06* (2006.01)

(52) U.S. Cl.
CPC ............... *B60J 7/141* (2013.01); *B60R 11/06* (2013.01)

(58) Field of Classification Search
CPC ....... B60J 7/14; B60J 7/141; B60J 7/16; B60J 7/1607; B60R 7/02
USPC ............ 296/100.01, 100.02, 100.04, 100.07, 296/100.09
See application file for complete search history.

(56) References Cited

U.S. PATENT DOCUMENTS

| 11,027,603 | B1 * | 6/2021 | Zheng | B60J 7/1607 |
| 11,130,393 | B2 * | 9/2021 | Allen | B60J 7/102 |
| 11,186,151 | B1 * | 11/2021 | Xu | B60J 7/198 |
| 11,331,990 | B2 * | 5/2022 | Carter | B60J 7/141 |
| 11,345,223 | B2 * | 5/2022 | Zheng | B60J 7/1607 |
| 11,673,459 | B2 * | 6/2023 | Dylewski, II | B60J 7/141 296/100.09 |
| 2006/0208524 | A1 * | 9/2006 | Brown | B60J 7/104 296/100.01 |
| 2012/0274091 | A1 * | 11/2012 | Yue | B60J 7/141 296/100.04 |
| 2012/0274092 | A1 * | 11/2012 | Yue | B60J 7/141 296/100.07 |
| 2017/0291478 | A1 * | 10/2017 | Hall | B60J 7/198 |
| 2019/0315209 | A1 * | 10/2019 | Lewis | B60J 7/141 |

\* cited by examiner

Primary Examiner — Jason S Daniels

(57) ABSTRACT

An external hard bed cover for pickup truck including a series of panels connected to a cargo hopper, wherein the panel series includes a super large panel, a large panel, a medium panel and a small panel, the super large panel is rotationally connected with the large panel, the large panel is rotationally connected with the medium panel, the medium panel is rotationally connected with the small panel, the super large panel, the large panel, the medium panel and the small panel are all rectangular panels.

9 Claims, 15 Drawing Sheets

EXTERNAL HARD BED COVER FOR A PICKUP TRUCK

CROSS REFERENCE TO RELATED APPLICATION

This application claims priority benefit of Chinese Invention Application No. 202210646503.0, filed on Jun. 9, 2022, and the entire contents of which are incorporated herein by reference.

TECHNICAL FIELD

This invention is relevant to automobile accessories, especially an external hard bed cover for a pickup truck.

BACKGROUND TECHNOLOGY

The cargo hopper of the pickup truck (also known as a sedan truck) is often used to carry goods. Since the cargo hopper is open, people invented the bed cover to avoid wetting the goods in the cargo hopper in rainy and snowy weather. Install the bed cover on the pickup truck's cargo hopper and use the cover to prevent the goods in the cargo hopper from getting wet by rain.

The structure of the current pickup truck bed cover is described below; however, customers prefer the current external car cover to have updated additional functions on the basis of wind and rain protection. Such as low cost and easy use. Most external hardcovers on the market use a wrench, which is troublesome to open or close the cover, you need to open or clamp one side of the wrench and then open or clamp the other. Therefore, we developed an external cover hard cover that is simpler to use, using a lock bolt fixing method on the surface of the cover panel with a high opening frequency and the wrench fixing method on the panel with a low opening frequency to reduce the cost.

About the Invention

The purpose of the invention is to provide an external hard bed cover for a pickup truck, which can change the switching mode of different parts of the cover through the improvement of the structure in combination with the user demand to make the use of the bed cover more convenient.

To solve the existing technical problem above, thus the invention uses the following method:

An external hard bed cover includes a panel series connected to a cargo hopper, wherein the panels series includes a super large panel, a large panel, a medium panel, and a small panel, the super large panel is rotationally connected with the large panel, the large panel is rotationally connected with the medium panel, and the medium panel is rotationally connected with the small panel.

The super large panel, the large panel, the medium panel, and the small panel are all rectangular panels. The small panel is connected with the medium panel by a small rotating, shaft, the medium panel is connected with the large panel by a medium rotating shaft, the large panel is connected with the super large panel by a large rotating shaft.

The small panel is connected to one end of the small rotating shaft, the other end of the small rotating shaft is connected to one end of the medium panel, the other end of the medium panel is connected to the medium rotating shaft, and the other end of the medium rotating shaft is connected to one end of the large panel, the other end of the panel is connected to one end of the large rotating shaft, the other end of the large rotating shaft is connected to the super large panel.

The super large panel and the large panel, the large panel and the medium panel, the medium panel and the small panel are respectively connected by rotating shafts. The large panel, the medium panel and the small panel can all be rotated with the rotating shaft as the axis to form a folding structure Further, the super large panel is connected to the end of the cargo hopper near the cab through the front rail clamp and the fixing system, the fixing system includes a fixing system bar connected to the super large panel, and the fixing system bar is connected to a fixing slider, the fixed slider is provided with a fixing hole; the fixing system bar points to both sides of the cargo hopper, the fixing system bar is provided with a sliding slot, the fixing slider is slidingly connected to the sliding slot of the fixing system bar, by the setting of the large panel, the medium panel, and the small panel, different panel can be opened according to different requirements, and the super large panel, the large panel, and the small panel are separately connected to the cargo hopper, which can be opened in sections according to the user requirements.

Further, the front rail fixing clamp includes a fixing clamp and a clamp assembly; the clamp assembly is used for clamping the fixing clamp and the cargo hopper, the clamp assembly includes a third clamping block and a fourth clamping block, the third clamping block and the fourth clamping block are connected by bolts, the fixing clamp includes a clamping portion connected to the clamp assembly, the clamping portion is connected to a fixing plane, the fixing clamp is provided with a limiting hole, the limiting hole is arranged on the fixing plane, the limiting bolt is a plum screw, the plum screw screwed into the threaded hole of the fixing slide until the plastic part of it reach the front bar fixing clamp plane. The method of using the plum screw to pass through the front rail fixing clamp is stronger than the conventional clamping method, and it is easy to locate which makes the installation of the bed cover easier to be centered. By using the plum screw, the screw will not be inclined, which is easier to install. The depth of the threaded hole is about 2.2 cm, which meets needs of different model of cars, if the height of the side rail is different, the depth of screwing into the fixing slider required for the plastic surface of plum screw to reach the upper clamping plane of the front rail fixing clamp different. The limit bolt passes through the limiting hole and connects with the fixing hole thread. By setting the clamp assembly and the fixing clamp, the super large panel can be connected to the cargo hopper. The super large panel is not easy to open since it is located at the end close to the front cab; the clamp assembly and fixing clamp are mainly to ensure the stable connection of the super large panel.

Further, the fourth clamping block is provided with a clamping opening for clamping the fixing clamp; the fixing clamp is provided with an adhesive side matched with the clamping opening, and the third clamping block and the fourth clamping block are both "L" shaped, the third clamping block is connected with a second tightening screw for supporting the fourth clamping block. The second tightening screw passes through the bottom of the third clamping block and tightens the bottom of the fourth clamping block to avoid the sliding of the clamp assembly caused by its gravity during long-term use, thus ensuring the clamping force; the clamping opening is wave-shaped, the opening of the fixing clamp is designed as a wavy to increase the clamping strength and ensure the stability of the connection of the fixing clamp. This connection is stable, although it is inconvenient to disassemble and switch, it, will not be easily released when using, which greatly improving the stability of the connection.

Further, the large panel is connected to the cargo hopper by a wrench system, the wrench system includes a transverse wrench bar, a slider snaps with the transverse wrench bar, and a wrench holder also snaps with the transverse wrench bar, the slider is slidingly connected to the transverse wrench bar, the slider is connected with a wrench. The transverse wrench bar is provided with a slot for connecting the wrench holder and the slider, the slider is slidingly connected to the slot of the transverse wrench bar, the wrench holder is used to limit the slider. Setting the transverse wrench bar ensures the strength of the large panel and facilitates the opening of the large panel and the cargo hopper. The two wrench holders are both arranged between the two sliders. The transverse wrench system connects the large panel with the cargo hopper. Since the wrench needs to be slipped when opening the large panel, to facilitate the movement of the wrench, setting the wrench holder to effectively prevent the wrench from sliding to the middle of the transverse wrench bar.

Further, the small panel is connected to the cargo hopper through a lock system; the lock system includes a lock bolt system bar connected to the small panel, both ends of the lock bolt system bar are respectively connected with a special-shaped screw by the lock bolt base, the middle of the lock bolt system bar is connected with a steel wire adjuster; the lock bolt base is slidingly connected with a lock bolt, the lock bolt is sleeved on the special-shaped screw, a reset spring is arranged between the lock bolt and the special-shaped screw, the two locking bolts are respectively connected with the steel wire adjuster through the steel wire, each steel wire passes through a handle. By setting the wire adjuster, the tightness of the steel wire can be adjusted, solving the problem of steel wire elongation and poor switching after long-term use. As the small panel is close to the end of the cargo hopper, it needs to be switched on and off frequently in actual use. By setting the lock system, using the lock bolt to connect the small panel to the cargo hopper, when it needs to be opened, just pull the handle, which is easy to operate, and when it is closed, just press the small panel closed.

Further, one end of the lock bolt is used to clamp with the cargo hopper, the other end of the lock bolt is connected with a steel wire, the steel wire is connected with the handle by a leather pull ring, the steel wire passes through the leather pull ring, the special-shaped screw includes a fixing end and a guiding end, the lock bolt includes a limiting end and a sliding end, the fixing end is fixedly connected to the lock bolt base, the guiding end is slidingly connected with the sliding end, the reset spring is connected with the guiding end, the two ends of the reset spring are respectively connected to the fixing end and the sliding end; by setting the reset, spring, it can be automatically reset after the lock bolt is pulled away, which does not affect the next closing; and through the tension of the reset spring, it can make the lock bolt tighter when it is locked, the special-shaped screw can be connected to the lock to ensure relative fixation, then the lock bolt is slidingly connected to the special-shaped screw to realize relative movement, finally achieve the movement of the lock bolt through the reset spring and steel wire. One side of the limiting end away from the sliding end is beveled; the limiting, end is designed to be beveled, when closing, only need to press the small panel to realize the closing of the small panel, the lock bolt bevel and the fixing clamp arc surface with frictional movement, when the lock bolt is scratched into the fixing clamp surface, the fixed clamp surface and the lock bolt plane contact, the bed cover is locked. The small panel includes a rectangular frame composed of a middle bar, a rear rail, two side rails, and a small fiberglass panel connected inside the rectangular frame, the lock bolt assembly fixed in the small fiberglass panel, the rear rail and the side rails are connected by a corner connector, the middle bar and the side rail are connect by a middle shaft connector. The steel wire adjuster is fixed to a wire adjusting base. The steel wire adjuster connects both ends of the steel wires and adjusts the steel wire tightness. When pulling any pull ring of the bolt system, the two lock bolts move towards each other. When loosening the pull ring, lock bolt moves in reverse under the spring rebound force, forming a switch lock action.

Further, the bed cover includes a mesh pocket; the mesh pocket is connected to the cargo hopper, and the super large panel, the upper part of the mesh pocket is connected to the cargo hopper by a hook, and the lower part of the mesh pocket is connected to the cargo hopper by a strap.

The advantage of the present invention is that the hard bed cover described in the present invention is easy to use, and the use of a lock bolt on the bed cover panel that is opening frequently can greatly improve the customer's experience. The lower using frequency bed cover panel still using a wrench fixing method. Using a plum screw that passes through the fixing hole on the upper clamp of the front rail fixing clamp and screwing it into the fixing slider is more secure than the traditional fixing method. And the car cover can be positioned so that the car cover is installed in the center.

Pictured: 11-Small panel; 111-Middle bar; 112-Side rail, 113-Tail rail; 114-Corner connector; 115-Medium shaft connector; 12-Medium panel; 13-Large panel; 14-Super large panel; 21-Small shaft; 22-Medium shaft; 23-Large shaft;

3-Lock system, 30-Reset spring; 32-Handle; 33-Lock bolt; 331-Limiting end; 332-Sliding end; 34-Special-shaped screw; 341-Fixing end; 342-Guide end; 35-Steel wire; 36-Steel wire adjusting Base; 37-Lock bolt base; 38-Steel wire adjuster; 39-Lock bolt system bar; 4-Wrench system; 41-Transverse Wrench bar; 42-Slider; 43-Wrench holder; 44-Wrench; 5-Fixing system; 51-Fixing system bar; 52-Fixing Slider, 521-Fixing hole, 6-Clamp system; 61-Clamp card surface; 62-Limiting plane; 63-First clamping block; 64-Second clamping block; 65-First tightening screw; 7-Front rail fixing clamp, 71-Third clamping block, 72-Fourth clamping block; 73-Fixing clamp, 74-Limiting bolt; 75-Fixing plane; 751-Limiting hole; 76-Second tightening screw; 8-Fluorescent strip.

The Concrete Method to Carry Out

The following instruction further explains the invention's concrete implementation method.

In order to enable a clearer understanding of the above-mentioned objects, features, and advantages of the present invention, the present invention will be described in detail below in connection with the accompanying drawings and specific embodiments. It should be noted that the embodiments of the present application and the features in the embodiments can be combined with each other without conflict.

The terms "first," "second," "third," etc. are only used to differentiate the description and should not be understood as indicating or implying relative importance.

In the description, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, the meanings of the above terms in the present invention can be understood in specific situations.

The specific embodiments of the present invention will be described in detail below in connection with the accompanying drawings. It should be understood that the specific embodiments described herein are intended only to illustrate and explain the present invention and are not intended to limit it.

Embodiment 1

Figure 1:
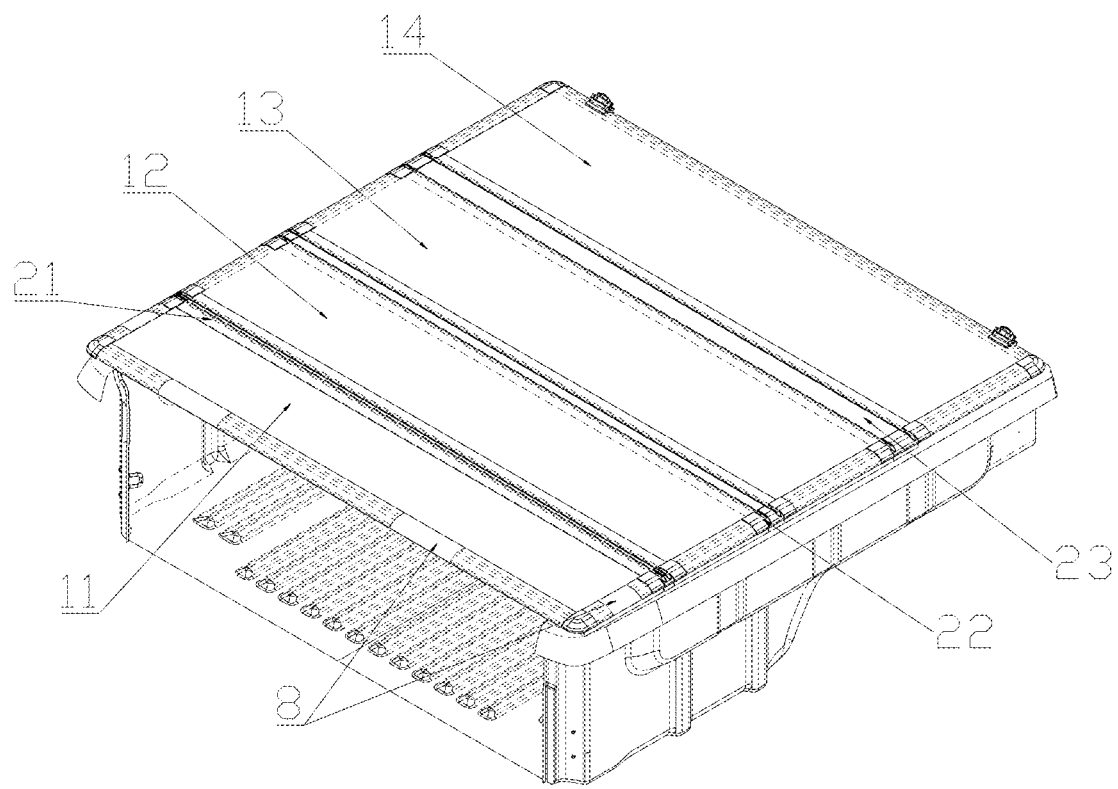
FIG. 1 is an installation diagram 1 of the present invention.

As shown in FIG. 1, an external hard bed cover includes a panel series connected to a cargo hopper, wherein the panels series includes a super large panel (14), a large panel (13), a medium panel (12) and a small panel (11), the super large panel (14) is rotationally connected with the large panel (13), the large panel (13) is rotationally connected with the medium panel (12), the medium panel (12) is rotationally connected with the small panel (11).

The super large panel (14) is connected to the cargo hopper through the front rail fixing clamp (7) and the fixing system (5).

The large panel (13) is connected to the cargo hopper by a wrench system (4).

The small panel (11) is connected to the cargo hopper by the lock system (3).

When the lock system is opened, the small panel (11) and the medium panel (12) can be opened at the same time. Further, when the wrench system (4) is opened, the large panel (13) can, be opened.

Embodiment 2

Figure 2:
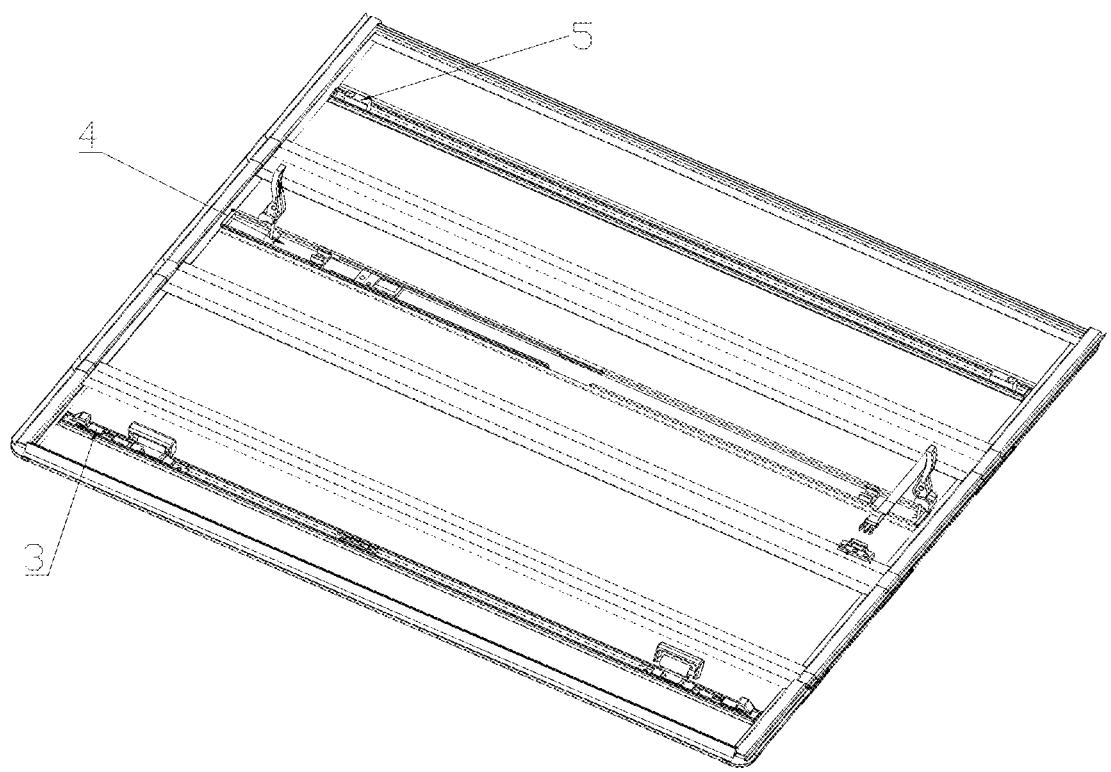
FIG. 2 is a schematic structural diagram of the present, invention.
Figure 3:
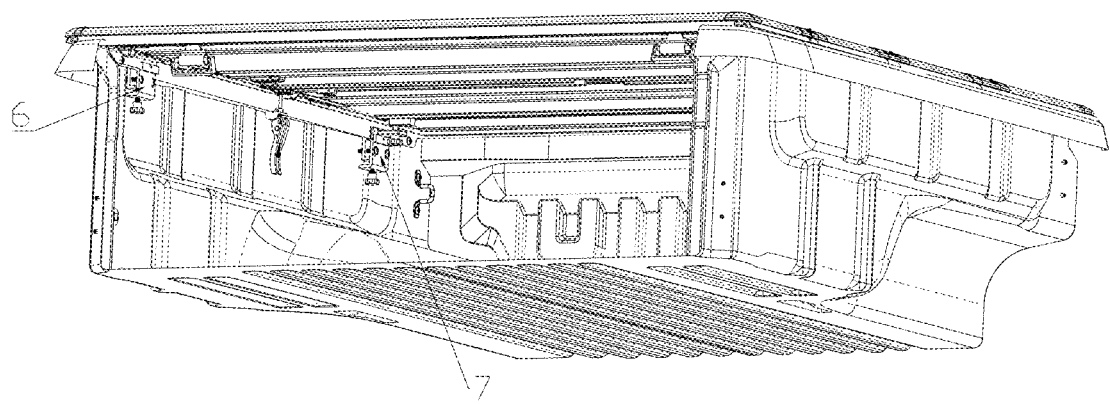
FIG. 3 is an installation diagram 2 of the present invention.
Figure 4:
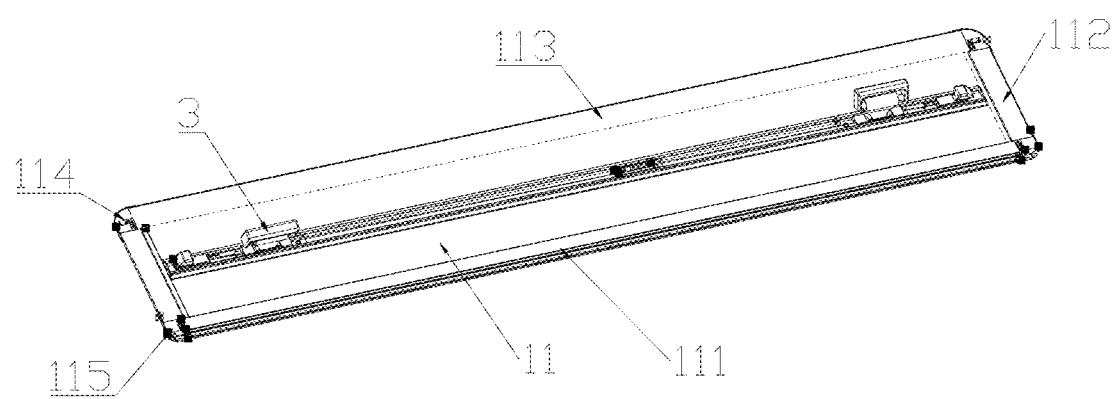
FIG. 4 is an installation diagram of the lock system in FIG. 1.
Figure 5:
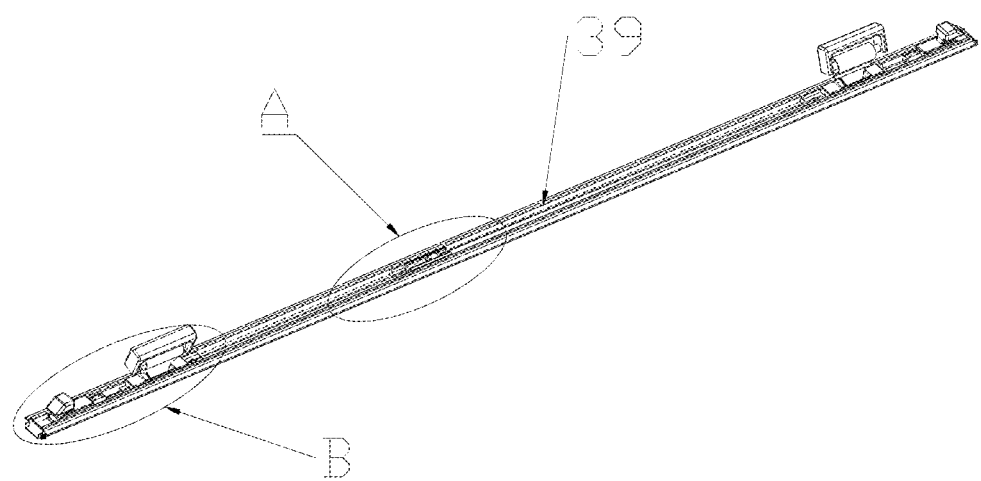
FIG. 5 is a schematic structural diagram of the lock system in FIG. 4.
Figure 6:
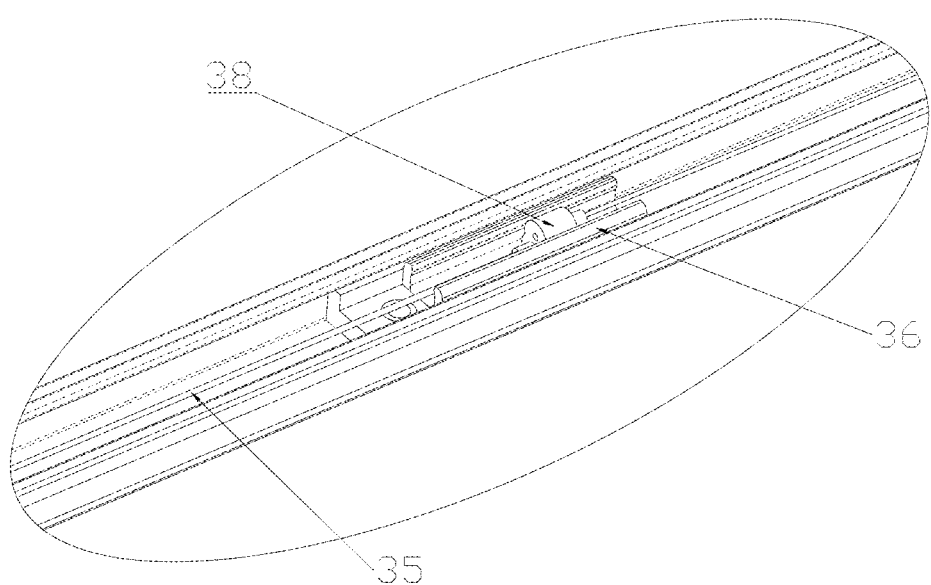
FIG. 6 is a partially enlarged view of Part A in FIG. 5.
Figure 7:
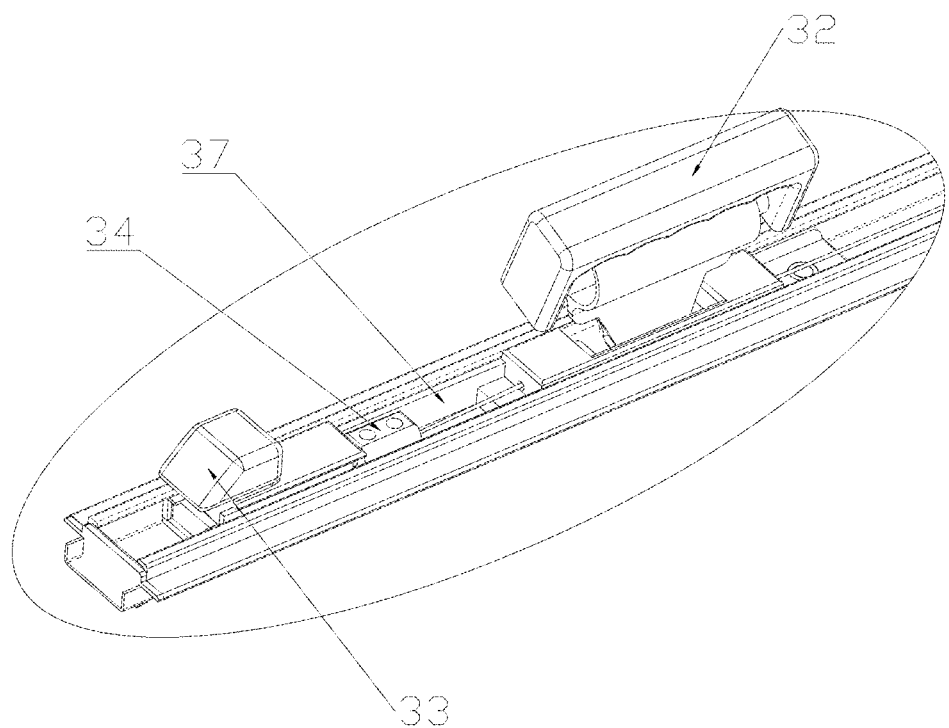
FIG. 7 is a partially enlarged view of Part B in FIG. 5.
Figure 8:
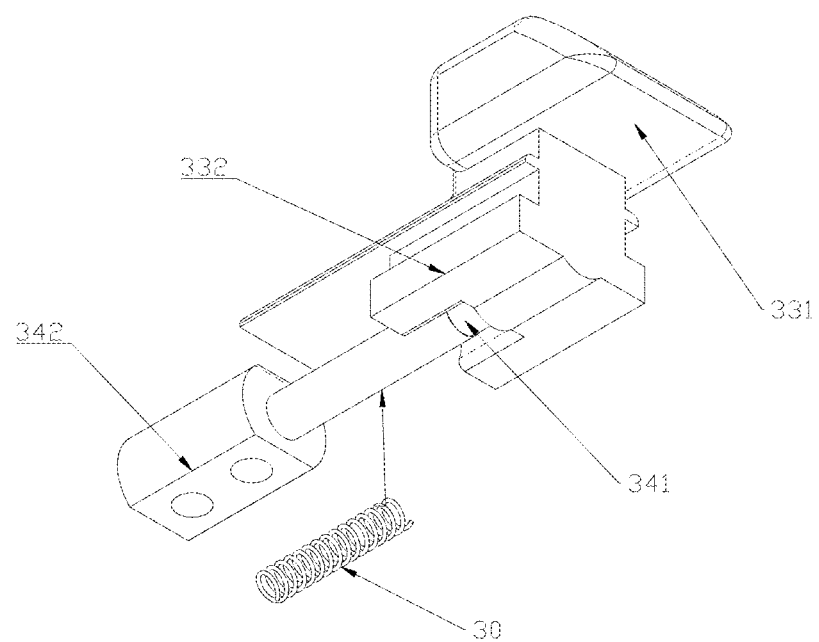
FIG. 8 is an installation diagram of the lock bolt in FIG. 7.
Figure 9:
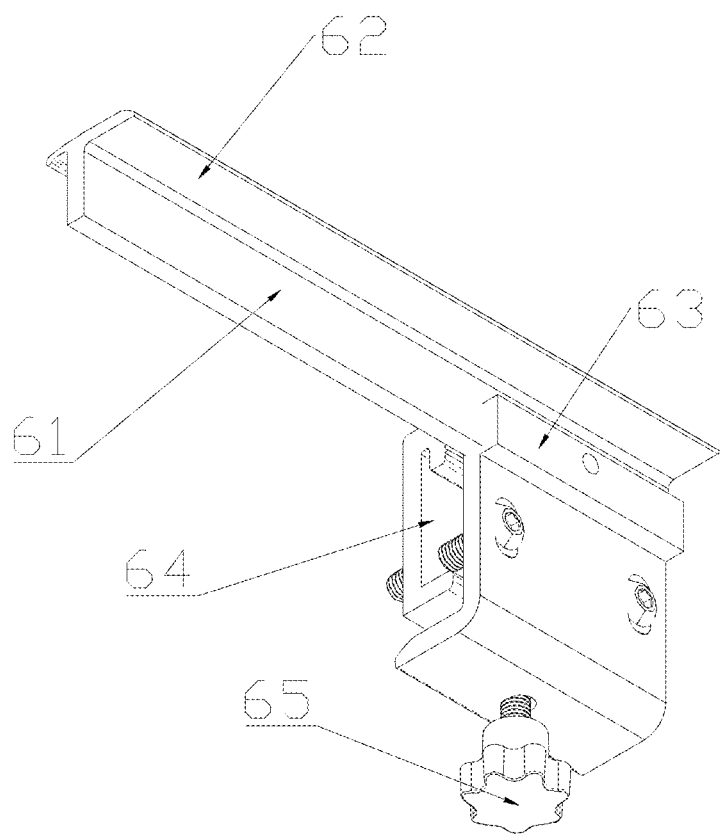
FIG. 9 is a schematic structural diagram of the clamp system in FIG. 3.
Figure 10:
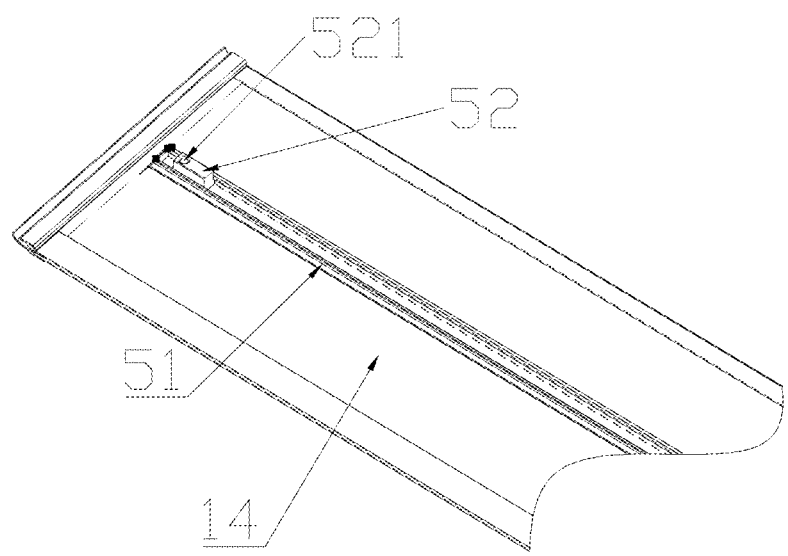
FIG. 10 is a schematic structural diagram of the fixing system.
Figure 11:
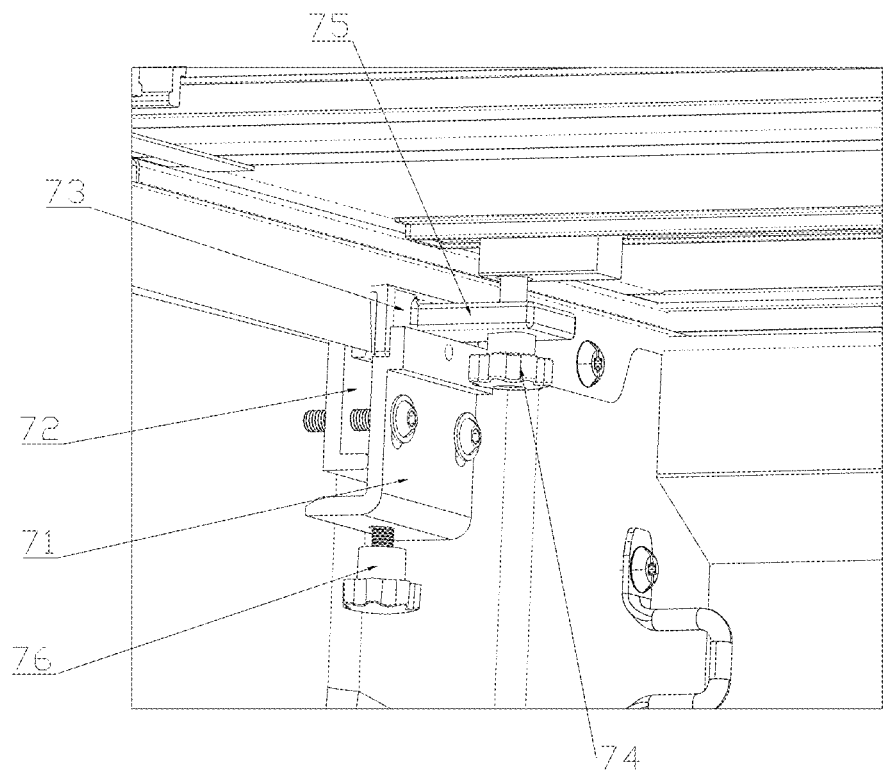
FIG. 11 is an installation diagram of the front rail fixing clamp.
Figure 12:
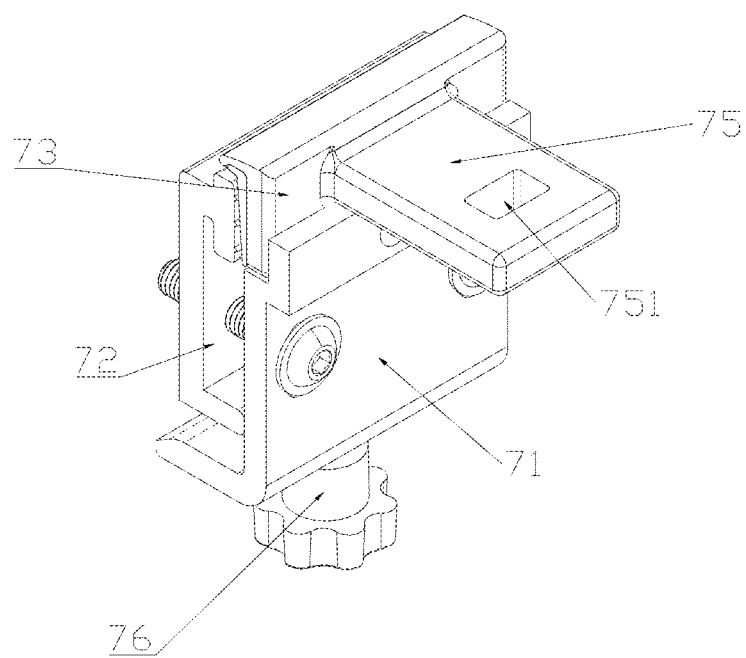
FIG. 12 is a schematic structural diagram of the front rail fixing clamp.

As shown in FIG. 1-3, an external hard bed cover includes a panel series connected to a cargo hopper, wherein the panels series includes a super large panel (14), a large panel (13), a medium panel (12) and a small panel (11), the super large panel (14) is rotationally connected with the large panel (13), the large panel (13) is rotationally connected with the medium panel (12), and the medium panel (12) is rotationally connected with the small panel (11).

The super large panel (14), the large panel (13), the medium panel (12), and the small panel (11) are all rectangular panels. The small panel (11) and the medium panel (12) are connected by a small rotating shaft (21), the medium panel (12) and the large panel (13) are connected by a medium rotating shaft (22), and the large panel (13) and the super large panel (14) are connected by a large rotating shaft (23).

The super large panel (14) and the large panel (13), the large panel (13) and the medium panel (12), the medium panel (12), and the small panel (11) are respectively connected by rotating shafts. The large panel (13), the medium panel (12), and the small panel (11) can all be rotated with the rotating shaft as the axis to form a folding structure.

Embodiment 3

On the basis of Embodiment 2, as shown in FIG. 9-12, the super large panel (14) is connected to the cab side of the cargo hopper through the front rail fixing clamp (7) and the fixing system (5), the fixing system (5) includes a fixing system bar (51) connected to the super large panel (14), the fixing system bar (51) is connected to a fixing slider (52), the fixing slider (52) is provided with a fixing hole (521), the fixing system bar (51) points to both sides of the cargo hopper, the fixing system bar (51) is provided with a sliding slot, the fixing slider (52) is slidingly connected to the sliding slot of the fixing system bar (51).

By setting the super large panel (14), the large panel (13), the medium panel (12), and the small panel (11), different hard bed covers can be opened according to various requirements; the super large panel (14), the large panel (13), the medium panel (12) and the small panel (11) are separately connected to the cargo hopper and can be opened in sections according to the needs of use.

The front rail fixing clamp (7) includes a fixing clamp (73) and a clamp assembly; the clamp assembly is used for clamping the fixing clamp (73) and the cargo hopper, the clamp assembly includes a third clamping block (71) and a fourth clamping block (72), the third clamping block (71) and the fourth clamping block (72) are connected by bolts, the fixing clamp (73) includes a clamping portion connected to the clamp assembly, the clamping portion is connected with the a fixing plane (75), the fixing clamp (73) is provided with a limiting hole (751), the limiting hole (751) is arranged on the fixing plane (75), the limiting bolt (74) is threaded to the fixing hole (521) through the limiting hole (751).

By setting the clamp assembly and the fixing clamp (73), the super large panel (14) can connect with the cargo hopper. The super large panel (14) is not easy to open since it is located at the end close to the front cab; the clamp assembly and fixing clamp (73) are mainly to ensure the stable connection of the super large panel (73).

The fourth clamping block (72) is provided with an opening for clamping the fixing clamp (73).

The fixing clamp (73) is provided with an adhesive side matched with the clamping opening, The third clamping block (71) and the fourth clamping block (72) are both "L" shaped, the third clamping block (71) is connected with a second tightening screw (76) to support the fourth clamping block (72).

The second tightening screw (76) passes through the bottom of the third clamping block (71) and tightens the fourth clamping block (72) to avoid the sliding of the clamp assembly caused by its gravity during long-term use, thus ensuring the clamping force.

The opening of the fixing clamp (73) is wave-shaped. The opening of the fixing clamp is designed as a wavy to increase the clamping force during clamping and ensure the stability of the connection of the fixing clamp.

When using, first align the fixing clamp (73) with the edge of the cargo hopper; then using the clamp assembly to clamp the cargo hopper and the fixing clamp (73); when clamping, the third clamping block (71) and the fourth clamping block (72) are first pre-connected by bolts, then clamp the cargo hopper and the fixing clamp (73) by the opening of the fourth clamping block (72) and the third clamping block (71), the bottom of the third clamping block (71) is connected with the second tightening screw (76), finally, the limiting bolt (74) passes through the limiting hole (751) to connect with the fixing hole (521).

This connection is stable; although it is inconvenient to disassemble and switch, it will not be easily released when using, which significantly improving the stability of the connection.

Embodiment 4

Figure 13:
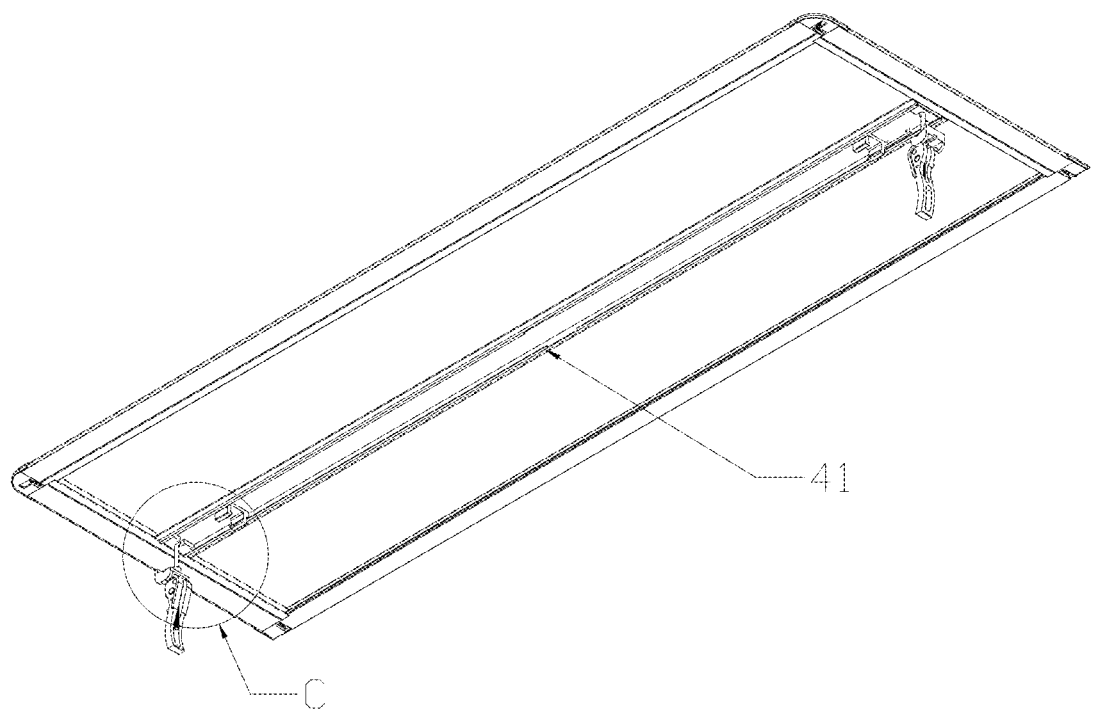
FIG. 13 is a schematic diagram of the installation structure of the wrench.
Figure 14:
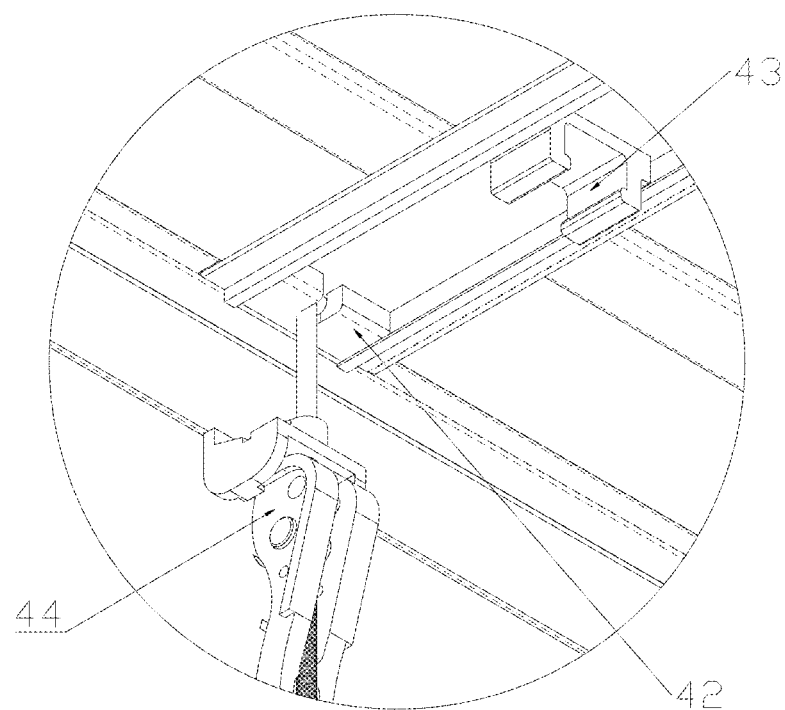
FIG. 14 is a partially enlarged view of part C in FIG. 13.

On the basis of Embodiment 3, as shown in FIG. 13-14, the large panel (13) is connected to the cargo hopper by a wrench system (4), the wrench system (4) includes a transverse wrench bar (41), a slider (42) snaps with the transverse wrench bar (41), and a wrench holder (43) also snaps with the transverse wrench bar (41), the slider (42) is slidingly connected to the transverse wrench bar (41), the slider (42) is connected with a wrench (44). The transverse wrench bar (41) is provided with a slot for connecting the wrench holder (43) and the slider (42), the slider (42) is slidingly connected to the slot of the transverse wrench bar (41), the wrench holder (43) is used to limit the slider (42). Both ends of the transverse wrench bar (41) are connected with an end cap (not shown in the diagram).

Setting the transverse wrench bar (41) not only ensures the strength of the large panel (13) but also facilitates the opening of the large panel (13) and the cargo hopper. When using, switch the wrench (44) to loosen the wrench (44) and the cargo hopper, and then move the slider (42), as long as the large panel (13) is open, the wrench (44) does not collide with the cargo hopper, the large panel (13) can be opened. When closing, first buckle the large panel (13), then slide the slider (42) to the side close to the cargo hopper and snap together with the cargo hopper, and finally rotate the wrench (44) to make the wrench (44) snap with the cargo hopper.

Two wrench holders (43) are both arranged between the two sliders (42). The transverse wrench system (4) is used to connect the large panel (13) to the cargo hopper.

Since the wrench (44) needs to be slipped when opening the large panel (13), to facilitate the movement of the wrench (44), the wrench holder (43) is set to effectively prevent the wrench (44) from sliding to the middle of the transverse wrench bar (41).

Embodiment 5

On the basis of Embodiment 4, as shown in FIG. 4-8, the small panel (11) is connected to the cargo hopper by the clamp system (6) and the lock system (3), the clamp system (6) includes a first clamping block (63), a second clamping block (64) and a support block, the first clamping block (63) and the second clamping block (64) are used to clamp the support block and the cargo hopper, to facilitate the lock system (3) buckle. The support block includes a clamping surface (61) and a limiting plane (62); the clamping surface (61) and the limiting plane (62) formed a "T" shaped structure. When using, the first clamping block (63) and the second clamping block (64) clamp the clamping surface (61) and the cargo hopper, the limiting plane (62) is used for locking with the lock system (3). The first clamping block (63) is connected with a first clamping bolt (65), the first clamping bolt (65) is used for clamping the second clamping block (64) to prevent the problem of sliding of the clamp system (6) caused by long-term use. Since the cargo hopper itself has no place for the lock system (3) to snap together, a clamp system (6) is added to enable the lock system (3) to snap with the cargo hopper through the clamp system (6).

The lock system (3) includes a lock bolt system bar (39) connected to the small panel (11), both ends of the lock bolt system bar (39) are respectively connected with a special-shaped screw (34) by the bolt base (37), the middle of the lock bolt system bar (39) is connected with a steel wire adjuster (38), the lock bolt base (37) is slidingly connected with a lock bolt (33), the lock bolt (33) is sleeved on the special-shaped screw (34), a reset spring (30) is arranged between the lock bolt (33) and the special-shaped screw (34), the two locking bolts (33) are respectively connected with the steel wire adjuster (38) through the steel wire (35), the steel wire adjuster (38) is connected to the lock bolt system bar (39) through the steel wire adjustment base (36), the two steel wires (35) pass through a handle (32) respectively. By setting the steel wire adjuster (38), the tightness of the steel wire (35) can be adjusted, solving the problem of steel wire elongation and poor switching after long-term use.

Since the small panel (11) is close the rear of the cargo hopper, it needs to be switched frequently in actual use. By setting the lock system, using the lock bolt (33) to connect the small panel (11) to the cargo hopper, when it needs to be opened, just pull the handle (32), which is easy to operate, and when it is closed, just press the small panel (11) closed.

One end of the lock bolt (33) is clamping with the cargo hopper, the other end of the lock bolt (33) is connected with a steel wire (35).

The steel wire (35) is connected to the handle (32) by a leather pull ring, and the steel wire (35) passes through the pull ring.

The special-shaped screw (34) includes a fixing end (341) and a guiding end (342), the lock bolt (33) includes a limiting end (331) and a sliding end (332), and the fixing end (341) is fixed to the bolt base (37), the guiding end (342) is sliding connected to the sliding end (332), the reset spring (30) is sleeved on the guiding end (342), the two ends of the reset spring (30) respectively connected to the fixing end (341) and the sliding end (332).

To facilitate opening, the steel wire (35) passes through the leather pull ring, when pulling the handle (32), the steel wire (35) was driven to move by the leather pull ring, thus causing the limiting end (331) to contract and realize the opening of the small panel (11).

By setting the reset spring (30), it can be automatically reset after the lock bolt (33) is pulled away, which does not affect the next closing; and through the tension of the reset spring (30), the lock bolt (33) can be tighter when it, is locked.

The steel wire (35) is connected with the sliding end (332).

The special-shaped screw (34) is connected with the lock bolt base (37) to ensure relative fixation, then the lock bolt (33) is slidingly connected to the special-shaped screw (34) to realize relative movement; finally, through the reset spring (30) and steel wire (35) to achieve the movement of the lock bolt (33).

One side of the limiting end (331) away from the sliding end (332) is beveled.

The limiting end (331) is designed as a beveled; when closing, only need to press the small panel (11) to realize the closing of the small panel (11).

The small panel (11) includes a rectangular frame composed of a middle bar (111), a tail rail (113) and two side rails (112), and a cover panel connected inside the rectangular frame, the tail rail (113) and the side rails (112) are connected by a corner connector (114), and the middle bar (111) and the side rail (112) are connected by a medium shaft connector (115).

The tail rail (113') and the side rail (112) are attached with a fluorescent strips (8), which absorbs light energy and then enters, the excited state and emits light (usually in the visible wavelength band); once the fluorescent strip (8) stops emitting light, the luminescence phenomenon disappears immediately. By setting of the fluorescent strips (8), when the headlights of the rear vehicles illuminate the fluorescent strips (8) at night, the fluorescent strip (8) enters the excited state and emits light, which has a good reminder effect for the owners of the rear Vehicles, and is convenient for the rear car to observe the distance of the car.

Embodiment 6

Figure 15:
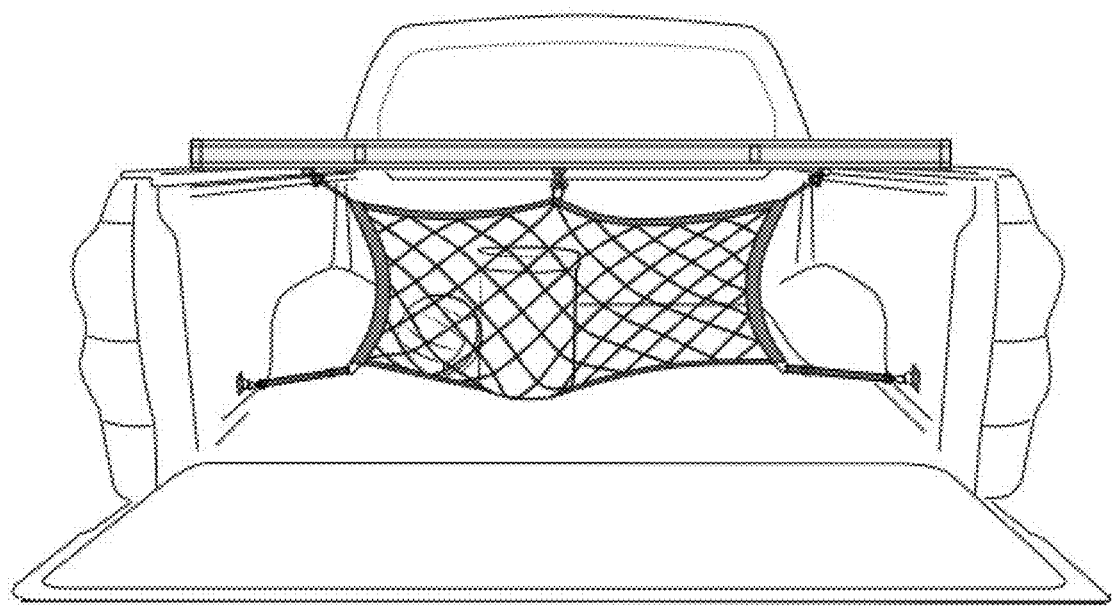
FIG. 15 is a schematic diagram of connection of the mesh pocket in the present invention.

On the basis of Embodiment 2, as shown in FIG. 15 the bed cover also includes a mesh pocket, the mesh pocket is connected to the cargo hopper and the super large panel (14), and fluorescent strips are attached to the sides and rear of the cargo box.

The upper part of the mesh pocket is connected to the cargo hopper by a hook, and the lower part of the mesh pocket is connected to the cargo hopper by a strap.

By setting the mesh pocket, people can fix goods during driving to avoid shaking goods during transportation.

The present invention is not limited to the above-mentioned optional embodiments; anyone can draw other various forms of products under the inspiration of the present invention. However, no matter what changes are made in its shape or structure, all technical solutions that fall within the scope defined by the claims of the present invention should fall within the protection scope of the present invention.

The invention claimed is:

1. An external hard bed cover for a pickup truck includes a panel series connected to a cargo hopper, wherein the panels series includes a super large panel (14), a large panel (13), a medium panel (12), and a small panel (11), the super large panel (14) is rotationally connected with the large panel (13), the large panel (13) is rotationally connected with the medium panel (12), and the medium panel (12) is rotationally connected with the small panel (11);

the super large panel (14) is connected to a cab side of the cargo hopper through a front rail fixing clamp (7) and a fixing system (5); the fixing system (5) includes a fixing system bar (51) connected to the super large panel (14), the fixing system bar (51) is connected to a fixing slider (52), the fixing slider (52) is provided with a fixing hole (521), the front rail fixing clamp (7) includes a fixing clamp (73) and a clamp assembly, the clamp assembly includes a third clamping block (71) and a fourth clamping block (72), the third clamping block (71) and the fourth clamping block (72) are connected by bolts, the fixing clamp (73) includes a clamping portion connected to the clamp assembly, the fixing clamp (73) is provided with a limiting hole (751), a limiting bolt (74) is threaded to the fixing hole (521) through the limiting hole (751);

the large panel (13) is connected to the cargo hopper by a wrench system (4); the wrench system (4) includes a transverse wrench bar (41), a slider (42) snaps with the transverse wrench bar (41), and a wrench holder (43) also snaps with the transverse wrench bar (41), the slider (42) is slidingly connected to the transverse wrench bar (41), the slider (42) is connected with a wrench (44);

the small panel (11) is connected to the cargo hopper by a clamp system (6) and a lock system (3); the lock system (3) includes a lock bolt system bar (39) connected to the small panel (11), both ends of the lock bolt system bar (39) are respectively connected with a special-shaped screw (34) by a bolt base (37), the middle of the lock bolt system bar (39) is connected with a steel wire adjuster (38), a reset spring (30) is arranged between the lock bolt (33) and the special-shaped screw (34), two lock bolts (33) are respectively connected with the steel wire adjuster (38) through a steel wire (35).

2. An external hard bed cover according to claim 1, wherein the clamping system (6) includes a first clamping block (63), a second clamping block (64), and a support block, the support block includes a clamping surface (61) and a limiting plane (62), the clamping surface (61) and the limiting plane (62) formed a "T" shaped structure, the limiting plane (62) is used for locking together with the lock system (3).

3. An external hard bed cover according to claim 1, wherein the third clamping block (71) and the fourth clamping block (72) are both "L" shaped, and the third clamping block (71) is connected to a second tightening screw (76) for supporting the fourth clamping block (72).

4. An external hard bed cover according to claim 2, wherein one end of the lock bolt (33) is used for engaging with the cargo hopper, the other end of the lock bolt (33) is connected with a steel wire (35), the steel wire (35) is connected with a handle (32) through a pull ring.

5. An external hard bed cover according to claim 4, wherein the special-shaped screw (34) includes a fixing end (341) and a guiding end (342), the lock bolt (33) includes a limiting end (331) and a sliding end (332), the fixing end (341) is fixed to the bolt base (37), the guiding end (342) sliding connected to the sliding end (332), a reset spring (30) is sleeved on the guiding end (342), two ends of the reset spring (30) respectively connected to the fixing end (341) and the sliding end (332).

6. An external hard bed cover according to claim 5, wherein the steel wire (35) is connected to the sliding end (332), the side of the limiting end (331) away from the sliding end (332) is beveled.

7. An external hard bed cover according to claim 4, wherein the small panel (11) includes a rectangular frame composed of a middle bar (111), a tail, rail (113), and two side rails (112), and a cover panel connected inside the rectangular frame, the tail rail (113) and the side rails (112) are connected by a corner connector (114), and the middle bar (111') and the side rail (112) are connected by a medium shaft connector (115).

8. An external hard bed cover according to claim 1, wherein the transverse wrench bar (41) is provided with a slot for connecting the wrench holder (43) and the slider (42), the slider (42) is slidingly connected to the slot of the transverse wrench bar (41), the wrench holder (43) is used to limit the slider (42), two wrench holders (43) are both arranged between two sliders (42).

9. An external hard bed cover according to claim 1, wherein further includes a mesh pocket; the mesh pocket is connected with the cargo hopper and the super large panel (14), the upper part of the mesh pocket is connected to the cargo hopper by a hook, the lower part of the mesh pocket is connected to the cargo hopper by a strap.

\* \* \* \* \*